United States Patent
Kazemzadeh

[11] Patent Number: 5,871,801
[45] Date of Patent: Feb. 16, 1999

[54] PROCESS FOR PRODUCING REDUCED-FLATULENCE, LEGUME-BASED SNACK FOODS

[76] Inventor: Massoud Kazemzadeh, 10025 Beard Ave. South, Bloomington, Minn. 55431

[21] Appl. No.: 822,292

[22] Filed: Mar. 21, 1997

[51] Int. Cl.$^6$ .................................................. A23L 1/20
[52] U.S. Cl. ...................... 426/634; 426/431; 426/507; 426/516
[58] Field of Search ................... 426/634, 629, 426/425, 431, 436, 443, 458, 463, 464, 465, 507, 508, 516, 517, 518; 425/376.1, 84, 85

[56] References Cited

U.S. PATENT DOCUMENTS

| | | | |
|---|---|---|---|
| 3,141,776 | 7/1964 | Kanfmann et al. | 99/80 |
| 3,141,777 | 7/1964 | Guidarelli et al. | 99/98 |
| 3,168,406 | 2/1965 | Moshy . | |
| 3,318,708 | 5/1967 | Rockland et al. | 99/98 |
| 3,615,677 | 10/1971 | Scharschmidt et al. | 99/85 |
| 3,635,728 | 1/1972 | Rockland | 99/98 |
| 4,079,155 | 3/1978 | Kakade | 426/634 |
| 4,113,889 | 9/1978 | Baxley | 426/509 |
| 4,124,727 | 11/1978 | Rockland et al. | 426/549 |
| 4,132,808 | 1/1979 | Kakade | 426/2 |
| 4,450,176 | 5/1984 | Stahel | 426/2 |
| 4,543,264 | 9/1985 | Stahel | 426/629 |
| 4,547,376 | 10/1985 | Silver et al. | 426/102 |
| 4,645,677 | 2/1987 | Lawhon et al. | 426/431 |
| 4,748,037 | 5/1988 | Matsumoto et al. | 426/448 |
| 5,026,568 | 6/1991 | Takemori et al. | 426/549 |
| 5,156,877 | 10/1992 | Kishi et al. | 426/624 |
| 5,296,253 | 3/1994 | Lusas et al. | 426/629 |
| 5,498,438 | 3/1996 | Strong et al. | 426/632 |

*Primary Examiner*—Anthony J. Weier
*Attorney, Agent, or Firm*—Kinney & Lange, P.A.

[57] ABSTRACT

A process for producing reduced-flatulence, legume-based snack foods. The process includes mixing legumes with an aqueous solvent and processing aids to form a legume solution. The legumes are in the legume solution are then allowed to hydrate. An aqueous solution oligosaccharides, polysaccharides, or combinations thereof is them extracted from the legume solution. The legume solution is mixed with a cereal flour to form a dough mixture. The dough mixture is then cooked and shaped.

26 Claims, 3 Drawing Sheets

PROCESS FOR PRODUCING REDUCED-FLATULENCE, LEGUME-BASED SNACK FOODS

BACKGROUND OF THE INVENTION

The present invention relates generally to a process for producing food products from legumes. More particularly, the present invention relates to a method for processing legumes to produce high-fiber, high-protein, reduced-flatulence snack foods.

Many types of legumes possess a variety of nutritional components, such as protein and fiber, in advantageous concentrations so that it is desirable to incorporate legumes into food products. In spite of these potentially beneficial sources of nutrients, the use of legumes in food products has been limited because many legumes produce flatulence after their digestion. Flatus produced in a person's intestinal tract not only leads to the potential for social embarrassment, but also causes personal discomfort, including abdominal rumblings, cramps, pain, and diarrhea.

As food is digested in humans, flatus is typically generated in the stomach and intestines. For most people, flatus generation rates are typically between 16 and 64 milliliters per hour. Factors that are known to impact flatus generation rates include diet, age, physiological status, and medical status. One particular type of food that is known to enhance flatus generation rates is legumes. Flatus production rates for certain legumes are as follows:

| Food ingredient | Intake | Flatus | Food ingredient | Intake | Flatus |
| --- | --- | --- | --- | --- | --- |
| Full fat Soya | 146 g | 30 ml/h | California white beans | 450 g | 36 ml/h |
| Soybeans | 100 g | 36 ml/h | Lima beans | 100 g | 42 ml/h |
| Defatted Soya | 146 g | 71 ml/h | Mung beans | 100 g | 25 ml/h |
| Navy bean meal | 146 g | 179 ml/h | Dutch brown bean | 250 g | 72 ml/h |
| Whole Bengal gram | 40 g | 52 ml/h | Dun peas | 210 g | 21 ml/h |
| Bengal gram (cotyledon) | 40 g | 44 ml/h | Lentils | 200 g | 41 ml/h |
| California white beans | 100 g | 120–137 ml/h | Red kidney beans | 100 g | 84 ml/h |

Attempts have been made to process legumes to reduce the amount of flatus generated during digestion. A primary drawback of these processes is that in addition to removing sugars that cause flatus, the processes also remove other desirable ingredients, such as vitamins, minerals, and soluble carbohydrates, from the legumes. Because these desirable ingredients are removed from legumes, the nutritional value of legumes is reduced.

Rockland et al., U.S. Pat. No. 3,318,708 (hereinafter "Rockland et al. '708"), and Rockland et al., U.S. Pat. No. 3,352,687 (hereinafter "Rockland et al. '687") disclose processes for producing quick-cooking legumes. The processes each describe placing dry beans in a hydrating medium and then subjecting the beans to cycles of vacuum and atmospheric pressure until the beans are hydrated to a desired extent. The hydrating medium used in these processes contains sodium chloride, a chelating agent and an alkaline agent. Rockland et al. '708 discloses drying the hydrated beans to a moisture content of between 9.5 and 10.5 percent. Rockland et al. '687 discloses freezing the hydrated beans until the beans are used.

Rockland, U.S. Pat. No. 3,635,728 (hereinafter "Rockland '728") describes a process for making quick-cooking soybean products in which bitterness and other undesired taste qualities of the soybeans are reduced. The process includes briefly contacting the beans with boiling water and then soaking the beans in an aqueous solution containing sodium chloride, a chelating agent, and an alkaline agent. The treated soybeans are then either dried or frozen.

Rockland et al., U.S. Pat. No. 4,124,727 (hereinafter "Rockland et al. '727"), discloses further processing of the hydrated legumes disclosed in Rockland et al. '708, Rockland et al. '687 or Rockland '728 to prepare a nutritionally balanced protein snack foods from legumes. This process includes mashing the hydrated legumes. A dough is then formed by mixing the mashed legumes with water methionine-containing ingredients, such as cereal grain flours, oil seeds, or oil seed flours. The dough is shaped and then fried in an edible oil.

Matsumoto et al., U.S. Pat. No. 4,748,037, describes using a twin screw extruder to produce snack-like cakes from various types of beans. The process includes feeding whole or hulled beans into a twin-screw extruder. During the extrusion process, the moisture content of the beans is between 8 and 50 percent. Extrusion causes the starch component of the beans to swell while texturizing the protein component of the bean so that the beans are formed into a cake.

Wagner et al., U.S. Pat. No. 3,876,807, describes a process for increasing the digestibility of legumes by maintaining the legumes in a medium having a pH of between 5.0 and 5.5 and a temperature of between 45° C. and 55° C. for between 24 and 48 hours. Lawhon et al., U.S. Pat. No. 4,645,677, discloses a process for removing flatulence-causing sugars from bean products by forming a solution of water and ground beans and then ultrafiltering the solution through a molecular weight cutoff of between 30,000 and 100,000 daltons. Stahel, U.S. Pat. Nos. 4,450,176 and 4,543,264, disclose methods for making beans more digestible by extracting components from the beans by exposing the beans to alcohol vapors.

SUMMARY OF THE INVENTION

The present invention includes a process for producing reduced-flatulence, legume-based snack foods. The process includes mixing legumes with an aqueous solvent and processing aids to form a legume solution. The legumes in the legume solution are hydrated. An aqueous solution, which includes oligosaccharides, polysaccharides, or combinations thereof, is extracted from the legume solution. The legume solution is mixed with a finely ground grain to form a dough mixture. The dough mixture is then shaped and cooked.

DETAILED DESCRIPTION OF THE PREFERRED EMBODIMENTS

Figure 1:
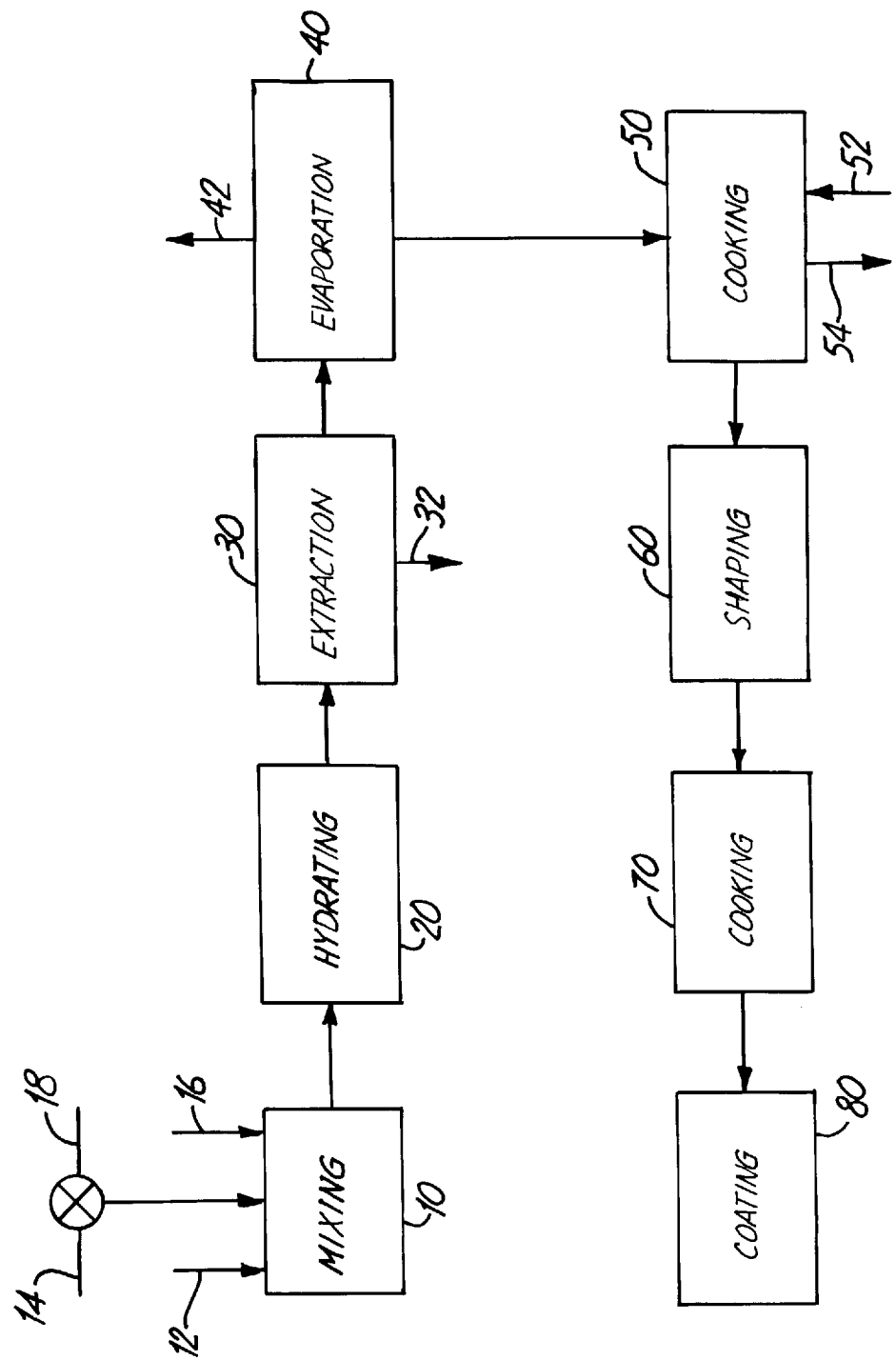
FIG. 1 is a schematic illustration of a process for producing high-fiber, high-protein, reduced-flatulence snack foods according to the present invention.

The present invention includes legume-based snack foods that are high in fiber and protein while exhibiting a decreased rate of flatus generation when digested. The present invention also includes a process for producing legume-based snack foods that are high in fiber and protein but exhibit a decreased rate of flatus generation when digested. A summary of the process of the present invention is outlined in FIG. 1.

As used herein, reference to the legume-based snack foods being high in fiber means that the legume-based snack foods have a protein concentration of between about 13 and 32 percent by weight on a dry matter basis. Reference to the legume-based snack being high in protein means that the legume-based snack foods have a fiber concentration of between about 4 and 16 percent by weight on a dry matter basis. Unless indicated to the contrary, all references to percent concentration in the present application are percent by weight.

Most legumes are good sources of protein, possessing between about 17 and 25 percent protein on a dry matter basis. Legumes are also typically a good source of fiber and carbohydrates as well as many vitamins, potassium, magnesium, and antioxidants. Because of these characteristics, it is desirable to produce legume-based snack foods. Legumes used in producing the legume-based snack foods according to the present invention have the added characteristic of containing reduced the concentrations of soluble sugars, such as oligosaccharides and polysaccharides, which are known to cause flatus when digested.

Because the legumes used in producing the snack foods produced according to the present invention have reduced concentrations of flatulence causing components, persons will be able to consume the snack foods without being concerned about having to suffer through the discomfort and social embarrassment associated with flatulence that typically results when consuming other legume-based foods. As such, persons will be more likely to consume snack foods produced according to the present invention so that the persons can benefit from having a diet that contains the nutritional components found in legumes.

While legumes proteins are rich in lysine, legumes are frequently not a good source of sulfur-containing amino acids, such as methionine and cystine. To compensate for these deficiencies and thereby provide protein having a nutritional quality that is similar to meat, the present invention uses cereal grain flours, oil seeds, and oil seed flours. Using these additional ingredients in conjunction with legumes enables the mixture thereby produced to have a complete amino acid profile.

The process of the present invention is suitable for use with a wide variety of legumes, beans, and other plants that contain and release certain sugars upon ingestion, resulting in flatulation in humans or animals. Examples of suitable legumes include field bean (*Phaseolus sp.*), white pea bean (also known as navy bean), Tepary bean (*P. Acutifolius* var. Latifolius), Mung bean (*P. aureus*) (also known as Chickasaw pea, Oregon pea, Neuman pea, Jerusalem pea, or chop suey bean), lima bean (*P. Limensis* or lunatus var. Macrocarpus), Broadbean (*Vicia faba*), Chickpea (*Cicer arietinium*), lentil beans (lentilla lens), peanuts (*Arachis hypogaea*), buckwheat (Polygonaceae), and flax (*Linum usitatissum*).

In an initial mixing step 10, legumes 12 are mixed with water 14 and processing aids 16. The legume mixture is then allowed to hydrate 20 until the legumes achieve a hydration point of between about 125 and 385 percent by weight of the dried weight of the legumes. Unless indicated otherwise in this application, all references to percent are percent by weight.

To enhance the hydration rate, the water is heated to a temperature of between about 50° F. and 210° F. Preferably, the water is heated to between about 175° F. and 180° F. To enhance the rate at which the legumes are heated, a portion of the water 14 added in the mixing stage 10 may be replaced with steam 18. Maintaining the water at a temperature in this preferred range enables the legumes to attain a desired degree of hydration in approximately 15 to 30 minutes.

To further reduce the time for the legumes to attain a desired degree of hydration, it is desirable for the legumes to be ground a grit size of between about 2 and 4 millimeters. Preferably, the legumes are ground to a grit size of between about 3 and 4 millimeters.

Because the legumes are ground when used in conjunction with the present invention, it is possible, and even preferable, to use broken legumes as the starting material. Using broken legumes in the present invention is highly desirable because broken legumes are a less costly material than unbroken legumes.

The hydration rate is also preferably enhanced by the addition of processing aids that assist in the disruption of the cellulose portion of the legume. As the processing aids enter the legume, the cotyledon of the legume is also disrupted so that the cellulose component of the cotyledon becomes porous and thereby enable water to totally infiltrate into the legume substructure.

The processing aids are also selected based on the ability to whiten the legumes and the ability to produce a given taste consistency in the final product, such as a tortilla-like taste that is common in a niximization process. Niximization is described as a reaction which takes place between the carbohydrates of corn-based grits and lime in the presence of excess water and some thermal heat. It is the process by which masa is produced for making of tortilla chips. It also can be described as a process that allows for the gelatinization of approximately 25 percent of the starch granules within the corn flour.

Processing aids that are suitable for use with the present invention include $CaO$, $CaCO_3$, $CaOH$, $CaSO_2$, $KOH$, $KCO_2$, $Na_2SO_4$, $Na_2CO_3$, $NaO$, $NaCl$, $NaOH$, $C_2H_4O_2$, $C_2H_3NaO_2$, or combinations thereof. The processing aids are preferably added to the legume and water mixture at a concentration of between about 0.1 and 1.5 percent. Preferably, the processing aids includes a mixture of $CaO$, $CaCO_3$, $CaOH$, where each processing aid has a concentration of between about 0.01 percent and 5.0 percent of the raw legume material. The total concentration of processing aids in this preferred configuration is less than about 10 percent by weight of the raw legume material.

When selecting processing aids, it is important that the processing aids do not produce an off-flavor in the final product. Two preferred processing aids for use with the present invention are $CaO$ and $CaCO_3$. Using these processing aids at concentrations of between about 0.5 and 1.0 percent produced snack foods having a taste that was similar to corn-based tortilla chips. The use of these processing aids also produces texture and crunch characteristics that were similar to tortilla chips.

The processing aids and the heat used during hydration play an important role in enhancing the total sugars removed from the legumes. At temperatures above 165° F. and durations of between 20 and 30 minutes, the hydration rates and cotyledon disassociation rates are maximized. The processing aids also preferably maintain the pH of the legume and water mixture between about 8.0 and 8.7. These factors are also directly related to producing snack foods with desirable taste characteristics.

Using legumes with a grit size of between about 3 and 4 millimeters enhances the ability to handle the legumes emerging from the hydrator because the hydrated legumes are more similar to solid particulates than a mush or single mass.

After the legumes have attained a desired degree of hydration, the legumes are extracted 30 using a high pressure expeller to thereby produce a legume press cake. Passing the hydrated legumes through the expeller produces an extracted solution 32 that contains water as well as most soluble sugars from the bean matrix. The expelled water typically contains all soluble sugars, oligosaccharides, polysaccharides, and starches as well as some soluble vitamins. Extraction does not fully disrupt the cell structure of the endosperm.

The expelled water is typically classified as either free water and interstitial water. The free water is loosely contained as a medium wherein the particles are suspended. The interstitial water is trapped between the crevices and interstitial spaces of the suspended solids.

It has been found that the amount of soluble sugars removed from the legumes is directly proportional to the pressure exerted in the expeller and the percentage of water removed from the legume mixture. The concentration of expelled water is typically between about 45 percent and 65 percent of the total hydrated water in the legume mixture. The removal of soluble sugars from the legumes is further enhanced by osmotic pressures of the cotyledon, which is caused by leaching of the soluble sugars occurring in the water present within the intercellular water of the cotyledon. Water in this area is classified as free water and this type of water is the easiest to remove from the legume mixture. Therefore, the amount of soluble sugars removed from the legume mixture is greater than 45 percent. Preferably, the process of the present invention removes more than 65 percent of the soluble sugars from the legume mixture.

To further enhance the amount of water that is removed from the legume mixture, the legume mixture is preferably subjected to evaporation 40. In the evaporation stage, between about 1 and 18 percent of the water 42 remaining in the legume press cake is removed from the legume press cake. At this point, the legume press cake has a moisture content of between about 35 and 75 percent.

After evaporation, additional ingredients 52 are added to the legume press cake to produce a dough mixture that possesses a complete amino acid profile. The mixture thereby enables snack foods produced according to the present invention to have a total dietary protein content having a nutritional content that is similar to meat protein.

Additional ingredients that are suitable for use with the present invention include cereal grains, oil seeds, and oil seed flour. Examples of suitable cereal grains are wheat flour, corn flour, buckwheat, spent barley, and combinations thereof. The legumes and additional ingredients are preferably mixed together at a weight-to-weight ratio of about 7:3. A person of ordinary skill in the art will appreciate that it is also possible to add other flavoring agents and colors to the dough mixture during this stage.

When it is desired for the legume-based snack foods to have a protein concentration proximate to a lower end of the protein concentration range, high-starch based cereals are selected for the additional ingredients. When it is desired for the legume-based snack foods to have a protein concentration proximate to an upper end of the protein concentration range, gluten, soya isolate or casein are selected for the additional ingredients.

When it is desired for the legume-based snack foods to have a fiber concentration proximate to a lower end of the fiber concentration range, whole grains including bran and some hulls are selected for the additional ingredients. When it is desired for the legume-based snack foods to have a fiber concentration proximate to an upper end of the fiber concentration range, defatted bran, high fiber containing grains, or pure fibers are selected for the additional ingredients.

The dough mixture is then cooked 50. Cooking in an extruder is preferably accomplished by three mechanism: conduction, convection, and mechanical energy. Conduction cooking is produced by the thermal energy from the barrel of the extruder. Convection cooking is caused by the addition of steam or other heated gases into the extruder. Mechanical energy is imparted to the dough by shearing imposed on the dough through shearing within the extruder. Shearing generated from mechanical energy can be detrimental to the texture and taste of such products if the protein is not fully hydrated as described in the previous steps.

The precooked dough exiting the extruder preferably has a moisture content of between about 16 and 35 percent. Depending on the moisture content of the cooked dough mixture, it may be desirable to further reduce the moisture content through evaporation or venting 54.

Upon exiting the extruder, the cooked dough mixture formed 60 into a desired shape. This typically involves either forming the dough into a flat sheet or cutting the dough into individual pieces. The preferred shaping method depends on the desired shape of the snack food products. Another option for shaping the dough involves heating the dough as the dough exits the extruder. This causes the dough to expand as the dough passes through the die. The temperature of the dough as the dough passes through the die is preferably between approximately 215° F. and 350° F.

Once the dough is formed into a desired shape, the shaped dough is further cooked 70. One option for this cooking stage is passing the shaped dough through a dryer at temperatures of between about 100° F. and 280° F. to reduce the moisture content of the dough to between approximately 3 and 11 percent. Alternatively, the shaped dough may be cooked in an oven at temperatures ranging between 280° F. and 375° F. Another option is to toast or puff the shaped dough in a convection or high velocity hot air ovens that operate at temperatures of between about 375° F. and 600° F. Yet another option for processing the shaped dough is to fry the shaped in a frying bath at temperatures of between about 225° F. and 385° F.

After the dough is completely cooked, the cooked dough may be coated 80 with additional seasonings using processes that are known to persons of ordinary skill in the art. One process for coating the cooked dough involves applying an adhesive, such as an oil or gum emulsion, on the cooked dough and then applying dried, powdered seasonings.

Figure 2:
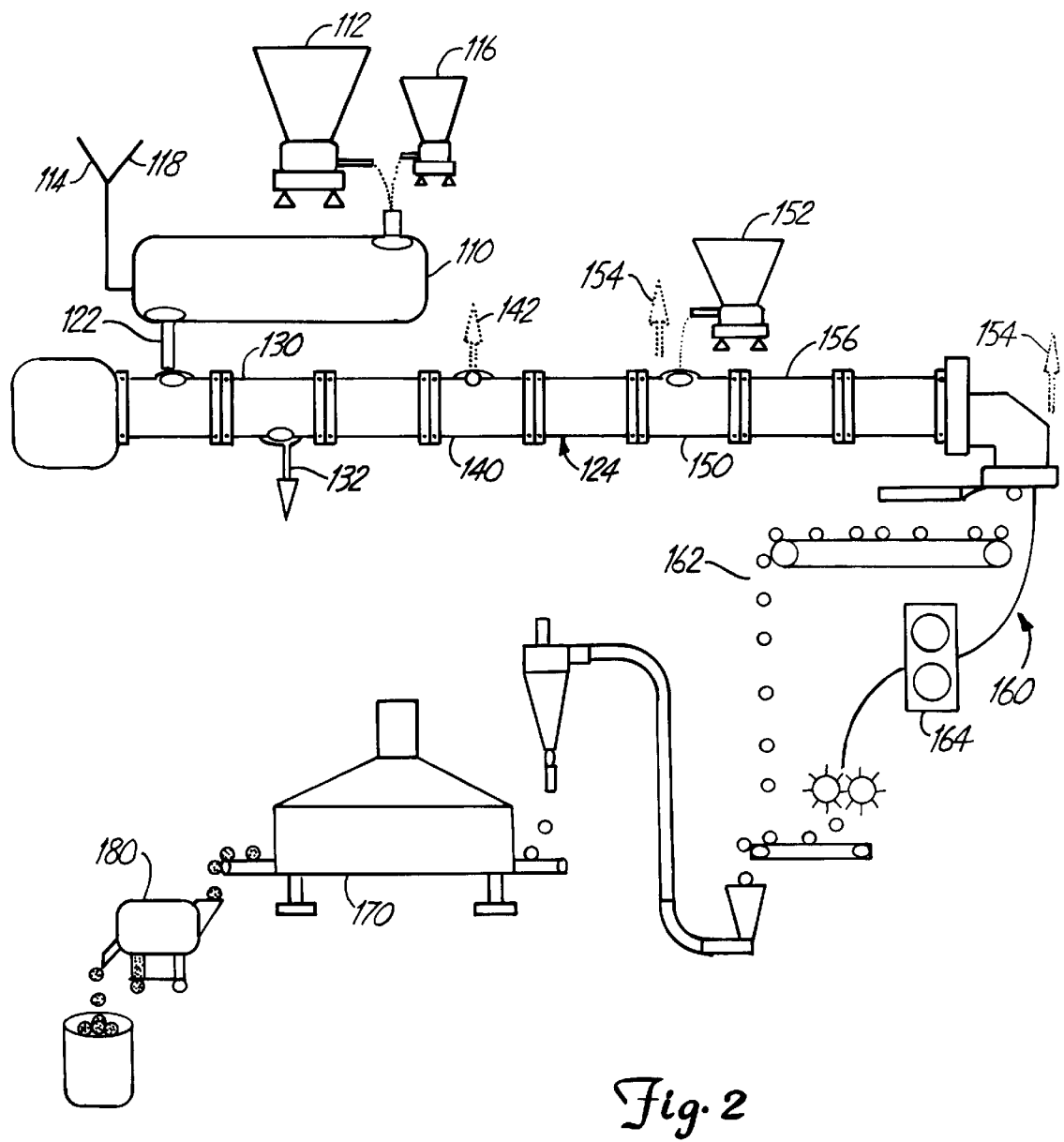
FIG. 2 is a schematic illustration of the process of the present invention implemented with a double screw extruder.

A preferred method of forming the snack food according to the present invention involves using a twin screw extruder. Using a twin screw extruder with the present invention permits several steps to be performed in a single apparatus. A schematic overview of the process for using the twin screw extruder is outlined in FIG. 2.

In this embodiment, legumes 112, water 114, processing aids 116, and steam 118 are mixed together in a hydrator 110. Hydrated legumes 122 are then fed into a twin screw extruder 124. The hydrated legumes then enter a pressurized zone 130 that causes a mixture 132 of water and soluble sugars to be expelled from the hydrate legumes. The pressurized zone 130 is created by varying the configuration of the screw and barrel of the extruder 124. The best results are accomplished when the screw configuration is designed in a manner where maximum pressures are between about 100 and 800 psi.

The pressure causes the expelled water to move backward opposite of the flow of the hydrated legumes within the extruder. The extruder includes a drain compartment for removing the expelled water from the extruder. The expelled water is discarded, carrying with it soluble sugars and chemicals, including the flatulents. At this stage, the hydrated legume press cake has a moisture content of between about 35 and 75 percent.

Next, the press cake passes through an evaporation zone 140 where the moisture content of the press cake is further reduced. In the evaporation zone, between about 1 and 18 percent of the water 142 remaining in the press cake is removed.

The press cake is then delivered to a mixing zone 150 where the press cake is mixed with water and additional ingredients 152, which improve the taste, texture and overall nutritional value of the snack food product. The combination of the legume press cake, the additional ingredients, and water forms a dough mixture. The additional ingredients 152 are preferably cereal grains that are added to the legume press cake at a ratio of about 7:3. Depending on the legumes and cereal grains used in this invention, the mixing zone may be heated to temperatures of greater than 100° F.

The dough mixture is then introduced into a cooking zone 156. In this zone, the ingredients in the dough mixture are more thoroughly mixed and cooked at temperatures of between 200° F. and 450° F. under pressure. During the mixing and cooking zones 150, 156, the moisture content of the dough mixture may be adjusted through evaporation 154.

The amount of cooking desired, as well as the type of texture needed for the end product, can be achieved by variation of shear through dispersive elements as well as particle size distribution. For example, larger particles tend to cook less and have the low cook flavoring that is common to tortilla chips.

After the cooking zone 156, the cooked dough is conveyed to a forming zone 160. In this zone, the cooked dough may be heated to yield a direct expanded product by following a first flow path 162. Alternatively, the cooked dough may be cooled to result in a half-product that may have a complete cooked profile but has not been expanded when leaving the die. This is achieved by cooling the cooked dough below the boiling point of water so that moisture content of the dough does not go through a phase change.

When forming the cooked dough into chips, the product is extruded through a slit die, such as is illustrated in a second flow path 164. This provides a never ending ribbon which is then cut by a rotary cutter and followed by drying, toasting, or a frying step.

The next element of this process includes toasting, baking, frying or drying step 170. These processes are accomplished using techniques that are known to one of ordinary skill in the art. The addition of topical flavoring and seasoning 180, as well as topical coloring, can be carried out following the cooking step 170.

Figure 3:
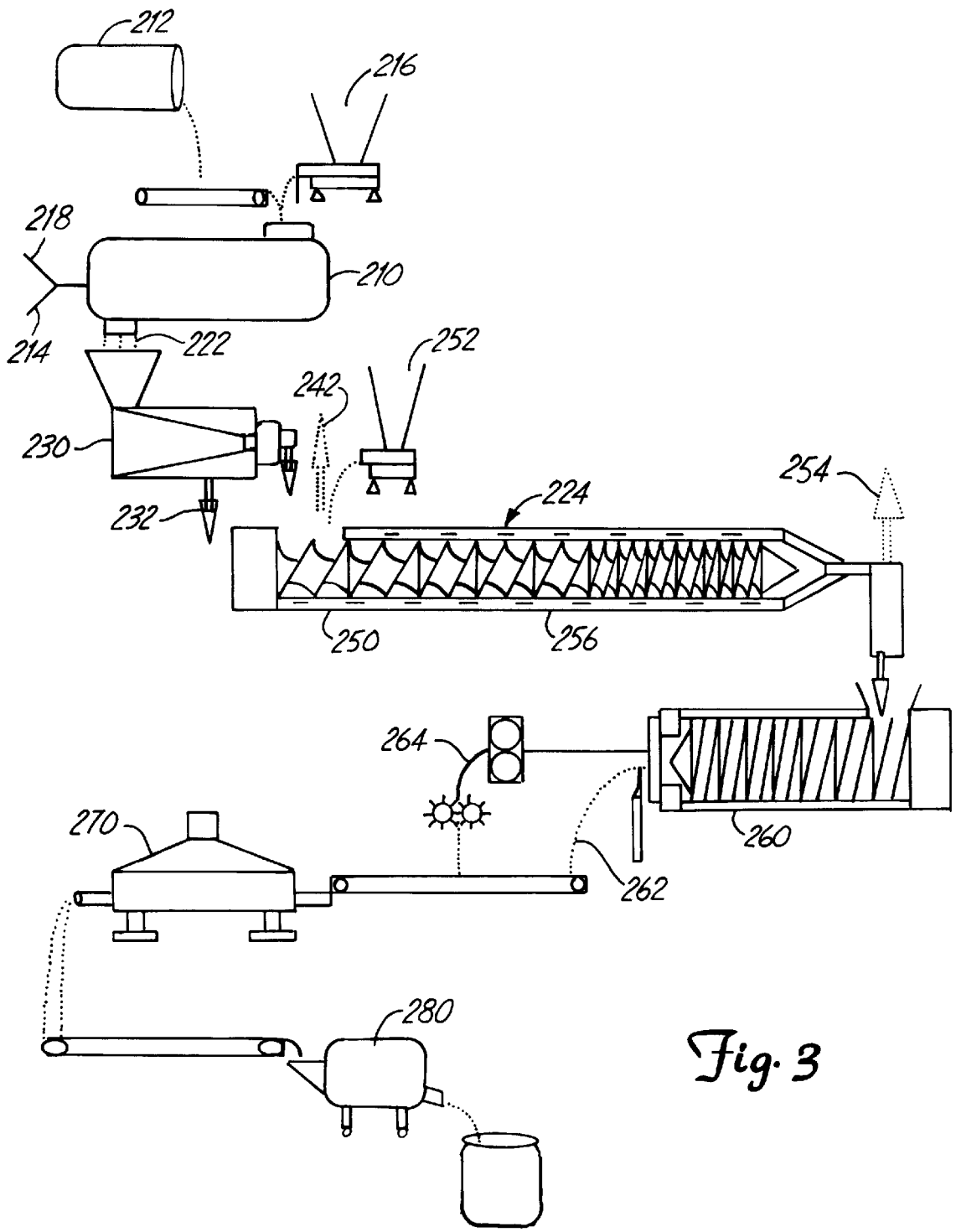
FIG. 3 is a schematic illustration of the process of the present invention implemented using single screw extruders.

A single screw extruder production process would have to incorporate the same steps and conditions outlined above, but would require the use of two extruders, one feeding into the other. A schematic overview of this process is set forth in FIG. 3.

In this embodiment, legumes 212, water 214, processing aids 216, and steam 218 are mixed together in a hydrator 210. Hydrated legumes 222 are then fed into an expeller 230, which causes a mixture 232 of water and soluble sugars to be expelled from the hydrate legumes.

As the press cake is transferred to a first extruder 224, the moisture content of the press cake is adjusted by evaporation 242. In the first extruder 224, the press cake is mixed with water and additional ingredients 252, which improve the taste, texture and overall nutritional value of the snack food product. The combination of the legume press cake, the additional ingredients, and water forms a dough mixture. Similar to the embodiment illustrated in FIG. 2, the additional ingredients 252 are preferably cereal grains that are added to the legume press cake at a ratio of about 7:3. Depending on the legumes and cereal grains used in this invention, the mixing zone may be heated to temperatures of greater than 100° F.

The dough mixture is then introduced into a cooking zone 256. In this zone, the ingredients in the dough mixture are more thoroughly mixed and cooked at temperatures of between 200° F. and 450° F. under pressure. During the cooking zone 256, the moisture content of the dough mixture may be adjusted through evaporation 254.

After the cooking zone 256, the cooked dough is transferred to a second extruder 260. In this extruder, the cooked dough may be heated to yield a direct expanded product by following a first flow path 262. When forming the cooked dough into chips, the product is extruded through a slit die, such as is illustrated in a second flow path 264. This flow path provides a never ending ribbon which is then cut by a rotary cutter and followed by drying, toasting, or a frying step.

The next element of this process includes toasting, baking, frying or drying step 270. These processes are accomplished using techniques that are known to one of ordinary skill in the art. The addition of topical flavoring and seasoning 280, as well as topical coloring, can be carried out following the cooking step 270.

The two extruder system is particularly desirable when it is desired to cool the cooked dough before the cooked dough passes through the die. The cooling of the cooked dough may also be accomplished by using a second forming extruder. With this configuration, the unfinished product exits the cooking extruder and enters the die of the cold forming extruder. Using a two extruder set up also permits the second extruder to have a larger die area. The larger die area permits products to be formed in more intricate shapes.

The die pressure utilized in the process of the present invention causes partial or full texturization of protein in the matrix of the snack foods produced according to the present invention. This technique achieves a high level of protein elongation and matrix development. The matrix is the part of the snack food that is responsible for development of a high crunch texture, with the finished snack food chips absorbing low levels of fat during frying.

Texturization of the product is also enhanced because the legumes are not cooked before entering the extruder. Rather, the legumes are hydrated in the presence of processing aids. Hydration allows the protein to behave differently within the extrusion system so as to produce a well developed matrix proximate to the die area. It is believed that the matrix properties are developed because the protein molecules follow a glass transition point within the extruder under pressure and high temperature without the protein molecules being damaged by high shear.

In the process of using the present invention to form chips, the matrix is expanded at the die and then collapsed by the sheeting rolls. This technique produces snack food chips with a hard crunch as well as a light texture.

In another configuration, the product is extruded into a sheet, cooked, and then ground. This configuration permits the product to be rehydrated and then mixed with other ingredients. An example is for producing tortilla chips containing rice in addition to beans processed according to the present invention.

EXAMPLES

The following examples are presented to illustrate the process of producing high-protein, high-fiber, reduced-flatulence snack food according to the present invention. These examples are not intended to limit the scope of the present invention.

Example 1

As a preliminary step in preparing the high-protein, high-fiber, reduced-flatulence snack chips according to the present invention, various processing aids were examined to evaluate their relative effectiveness at hydrating legumes. Pinto beans were used in conducting this analysis. The ability of the processing aids to produce legumes with a softened endosperm and a light color were also evaluated.

Processing aids used in this example were acetic acid ($C_2H_4O_2$), sodium hydroxide (NaOH), sodium chloride (NaCl), sodium sulfate ($Na_2SO_4$), sodium carbonate ($Na_2CO_3$), sodium acetate ($C_2H_3NaO_2$), potassium hydroxide (KOH), calcium carbonate ($CaCO_3$), calcium hydroxide (CaOH), and calcium oxide (CaO).

Each of the samples was prepared by placing approximately 20 grams of whole pinto beans into a container. A solution was prepared by dissolving the processing aids in approximately 200 grams of water, which was heated to a temperature of between about 175° F. and 180° F. The solution was then added to the container holding the pinto beans and the container was placed into a water bath having a temperature of between about 175° F. and 180° F. The pinto beans were then allowed to hydrate for approximately 30 minutes.

After the hydration period was completed, the water was drained from the container and the hydrated pinto beans were placed on absorbent tissue to dry the surface of the pinto beans. For some of the samples, the water drained from some of the hydrated pinto bean samples was colored indicating that the water may have contained solubles that were extracted from the pinto beans when the pinto beans were hydrating. Extraction of solubles during the hydration process results in an end weight gain as a net weight gain compared with the solubles, which were extracted during hydration.

Once the hydrated pinto beans cooled to approximately room temperature, the weight of the hydrated pinto beans was measured. The softness and color of the hydrated pinto beans were evaluated on a subjective basis and rated from 1 to 10, with higher numbers indicating a darker color and a more pliable endosperm.

The results of the samples are reported in Table 1. CaO (Samples 21–23), $CaCO_3$ (Samples 13–16), and CaOH (Samples 17–20) provided the best combination of hydration, softness, and color at lower concentrations.

TABLE 1

| Sample No. | Processing aid | Weight of processing aid added | Final weight of legume mixture | Softness | Color |
|---|---|---|---|---|---|
| 1 | $C_2H_4O_2$ | 1.0 ml | 29.14 g | 1 | 1 |
| 2 | NaOH | 1.0 ml | 40.16 g | 5 | 8 |
| 3 | None |  | 32.44 g | 5 | 1 |
| 4 | $Na_2SO_4$ | 2.0 g | 43.01 g | 4 | 3 |
| 5 | $Na_2CO_3$ | 2.0 g | 43.13 g | 6 | 5 |
| 6 | $C_2H_3NaO_2$ | 2.0 g | 43.74 g | 3 | 1 |
| 7 | NaCl | 2.0 g | 45.44 g | 0 | 2 |
| 8 | NaCl | 4.0 g | 28.90 g | 2 | 2 |
| 9 | KOH | 1.0 g | 38.56 g | 6 | 6 |
| 10 | KOH | 2.0 g | 38.37 g | 7 | 8 |
| 11 | KOH | 4.0 g | 39.43 g | 8 | 9 |
| 12 | KOH | 8.0 g | 41.04 g | 10 | 10 |
| 13 | $CaCO_3$ | 0.5 g | 30.04 g | 4 | 1 |
| 14 | $CaCO_3$ | 1.0 g | 31.80 g | 5 | 1 |
| 15 | $CaCO_3$ | 2.0 g | 33.07 g | 6 | 1 |
| 16 | $CaCO_3$ | 4.0 g | 35.30 g | 6 | 1 |
| 17 | CaOH | 0.0 g | 33.11 g | 4 | 3 |
| 18 | CaOH | 0.5 g | 32.58 g | 5 | 4 |
| 19 | CaOH | 1.0 g | 31.08 g | 6 | 4 |
| 20 | CaOH | 2.0 g | 32.08 g | 6 | 4 |
| 21 | CaO | 0.1 g | 33.78 g | 7 | 2 |
| 22 | CaO | 0.5 g | 34.70 g | 6 | 3 |
| 23 | CaO | 1.0 g | 35.17 g | 5 | 3 |
| 24 | CaO | 2.0 g | 34.34 g | 5 | 3 |

A taste test was also performed using each of the samples. Similar to the softness and color evaluations, the taste of the hydrated pinto beans was evaluated on a subjective standard.

Overall, the samples using CaO (Samples 21–23) and $CaCO_3$ (Samples 13–16) exhibited the least amount of off-flavor, along with the best hydration and color. While using KOH (Samples 9–12) and NaCl (Samples 7–8) hydrated pinto beans with the least amount of off-flavor and a desirable color, the KOH and NaCl samples exhibited a lesser degree of hydration.

Example 2

The hydrated pinto bean samples produced in Example 1 were extracted using a hand-held squeezing device that was capable of producing a force of approximately 50 pounds per square inch. Approximately 20 grams of each cooled, hydrated pinto bean sample were placed in the squeezing device and then pressure was applied to the sample to extract water therefrom. This squeezing device enabled each of the hydrated pinto bean samples to be subjected to an approximately equal force per unit area.

The results of the extractions are set forth in Table 2.

TABLE 2

| Sample No. | Processing Aid | Weight of processing aid added | Weight of hydrated legumes | Weight of extracted cake | Color of extracted water |
|---|---|---|---|---|---|
| 1 | $C_2H_4O_2$ | 1.0 ml | 29.14 g | 1.0 g | 1 |
| 2 | NaOH | 1.0 ml | 40.16 g | 5.0 g | 6 |
| 3 | None |  | 32.44 g | 5.0 g | 2 |
| 4 | NaCl | 4.0 g | 28.90 g | 2.0 g | 2 |
| 5 | $Na_2SO_4$ | 2.0 g | 43.01 g | 4.0 g | 4 |
| 6 | $Na_2CO_3$ | 2.0 g | 43.13 g | 6.0 g | 6 |
| 7 | $C_2H_3NaO_2$ | 2.0 g | 43.74 g | 3.0 g | 3 |
| 8 | NaCl | 2.0 g | 45.44 g | 0.0 g | 3 |
| 9 | KOH | 1.0 g | 38.56 g | 6.0 g | 7 |
| 10 | KOH | 2.0 g | 38.37 g | 7.0 g | 9 |
| 11 | KOH | 4.0 g | 39.43 g | 8.0 g | 9 |

TABLE 2-continued

| Sample No. | Processing Aid | Weight of processing aid added | Weight of hydrated legumes | Weight of extracted cake | Color of extracted water |
|---|---|---|---|---|---|
| 12 | KOH | 8.0 g | 41.04 g | 10 g | 10 |
| 13 | CaCO$_3$ | 0.5 g | 30.04 g | 4.0 g | 1 |
| 14 | CaCO$_3$ | 1.0 g | 31.80 g | 5.0 g | 1 |
| 15 | CaCO$_3$ | 2.0 g | 33.07 g | 6.0 g | 1 |
| 16 | CaCO$_3$ | 4.0 g | 35.30 g | 6.0 g | 1 |
| 17 | CaOH | 0.1 g | 33.11 g | 4.0 g | 2 |
| 18 | CaOH | 0.5 g | 32.58 g | 5.0 g | 3 |
| 19 | CaOH | 1.0 g | 31.08 g | 6.0 g | 3 |
| 20 | CaOH | 2.0 g | 32.08 g | 6.0 g | 4 |
| 21 | CaO | 0.1 g | 33.78 g | 7.0 g | 1 |
| 22 | CaO | 0.5 g | 34.70 g | 6.0 g | 2 |
| 23 | CaO | 1.0 g | 35.17 g | 5.0 g | 2 |
| 24 | CaO | 2.0 g | 34.34 g | 5.0 g | 2 |

In most of the literature, the speed of hydration as well as the quantity has been correlated with the alkalinity of the solution. Varying the alkalinity was believed to allow the cellulose coating of the beans, as well as the internal walls, to relax and thereby permit water to infiltrate the seed. However, from the above experiment, it is evident that calcium plays a major role in the relaxation and hydration of the cotyledon cell walls, thus making the extraction more efficient.

With the concept of niximization, carbohydrates and some proteins react with calcium-enriched medium at a somewhat elevate pH (7.8–8.5) and heat. This process results in a product that is easily workable and relaxed in its matrix. Because of these properties, the legumes are easily cookable under normal extrusion temperatures and parameters so that the product thereby produced has a desirable flavor that is similar to corn-based tortilla chips.

Example 3

The process set forth in Example 2 was repeated using pinto beans that were ground to a grit size of between about 2 and 4 millimeters. The processing aids used in hydrating these pinto bean samples were either a mixture of CaO and Na$_2$CO$_3$ or a mixture of CaO and CaCO$_3$. The results of the extraction tests are set forth in Table 3.

TABLE 3

| Sample No. | Processing Aid | Weight of processing aid added | Weight of hydrated legumes | Weight of extracted cake | Color of extracted water |
|---|---|---|---|---|---|
| 1 | CaO<br>Na$_2$CO$_3$ | 0.1 g<br>0.5 g | 56.38 g | 39.22 g | 2 |
| 2 | CaO<br>Na$_2$CO$_3$ | 0.5 g<br>0.5 g | 65.57 g | 43.25 g | 4 |
| 3 | CaO<br>Na$_2$CO$_3$ | 0.5 g<br>1.0 g | 61.39 g | 43.39 g | 3 |
| 4 | CaO<br>Na$_2$CO$_3$ | 0.5 g<br>1.0 g | 55.79 g | 40.06 g | 2 |
| 5 | CaO<br>CaCO$_3$ | 0.1 g<br>0.5 g | 59.39 g | 37.23 g | 1 |
| 6 | CaO<br>CaCO$_3$ | 0.5 g<br>0.5 g | 67.57 g | 42.23 g | 2 |
| 7 | CaO<br>CaCO$_3$ | 0.5 g<br>1.0 g | 64.35 g | 42.29 g | 2 |
| 8 | CaO<br>CaCO$_3$ | 0.5 g<br>1.0 g | 57.89 g | 40.26 g | 1 |

The results generally indicate that grinding the pinto beans produces a higher level of hydration than hydration performed on whole pinto beans. The samples also exhibited good flavor and color characteristics.

Another point to note is that the mixture of CaO and CaCO$_3$ (Samples 25–28) produced a greater amount of hydration and a greater amount of extraction at a given concentration than the mixture of CaO and NaCO$_3$ (Samples 29–32).

It was found that the pH of the solution used for hydrating the pinto beans did not play an important role with these samples because the processing aids were added at a sufficiently small concentration so that the proteins in the pinto beans were able to buffer the solution to a desired extent.

Example 4

The process of the present invention was evaluated for producing snack chips from kidney beans. The kidney beans were initially ground to a particle size of between about 2 and 4 millimeters. Each of the samples was prepared using approximately 100 grams of ground kidney beans that were submerged in approximately 250 grams of water along with the designated concentrations of processing aids. The concentration of the processing aids was calculated based on the weight of the raw kidney bean material used.

The ground kidney bean solution was maintained at a temperature of between about 175° F. and 180° F. for about 20 minutes to permit the kidney beans to hydrate. After the hydration period was completed, water was drained from the kidney beans and the weight of the hydrated kidney beans was measured.

Water was extracted from the hydrated kidney beans using the extracting device and process described in Example 2. The press cake was then evaluated for color, taste, and overall appearance. The press cake was then formed into a sheet, cut into pieces, and fried so that the texture of chips produced according to the present invention could be evaluated.

The results of these samples are set forth in Table 4. The color and taste of the press cake as well as the taste of the chips were evaluated on a scale of 1 to 10 with lower values indicating a lighter color and less off-flavor. The results indicate that the addition of calcium in the form of oxides, hydroxides, or carbonates produces an end product (chips) with desirable taste and appearance characteristics. In particular, the results display that the use of CaO, CaCO$_3$ and/or CaOH at concentrations of between about 0.01 percent and 5.0 percent and with a total processing aid concentration of not more than about 10 percent enable chips to be produced with desirable characteristics.

TABLE 4

| Sample No. | Processing aid | Concentration of processing aid | Weight of hydrated legumes | Weight of press cake | Color/taste of press cake | Taste of chip |
|---|---|---|---|---|---|---|
| 1 | CaO<br>CaCO$_3$<br>CaOH | 0.5%<br>5.0%<br>0.1% | 283.9 g | 271.5 g | 1/2 | 1 |
| 2 | CaO<br>CaCO$_3$<br>CaOH | 1.0%<br>5.0%<br>0.1% | 327.9 g | 216.5 g | 1/1 | 2 |
| 3 | CaO<br>CaCO$_3$<br>CaOH | 2.0%<br>5.0%<br>0.1% | 329.9 g | 219.5 g | 1/2 | 2 |
| 4 | CaO<br>CaCO$_3$<br>CaOH | 0.5%<br>5.0%<br>0.05% | 310.8 g | 216.8 g | 1/1 | 1 |

While the chips produced in this example did not include cereals or other raw materials, the press cake properties and the chip properties indicate that chips having a light color and little or no off-flavor can be produced according to the present invention. Cereals and other raw materials may be added to the press cake to provide the chips with an amino acid profile, which is similar to meat protein, as well as to provide vitamins and other nutrients that may have been removed from the legumes during the processing operations. However, an important point to note is that the most essential components of the legumes are retained in the process of the present invention, namely, the protein and fiber content that is present in the hull and cotyledon portions of the legume.

Although the present invention has been described with reference to preferred embodiments, workers skilled in the art will recognize that changes may be made in form and detail without departing from the spirit and scope of the invention.

What is claimed is:

1. A process for producing a reduced-flatulence, legume-based snack food, the process comprising:

mixing legumes with an aqueous solvent and processing aids to form a legume solution;

hydrating the legumes in the legume solution;

passing the legume solution through an extruder to extract an aqueous solution from the legume solution and form a legume press cake, wherein the aqueous solution contains oligosaccharides, polysaccharides, or combinations thereof;

mixing additional ingredients with the legume press cake to form a dough mixture;

shaping the dough mixture; and cooking the shaped dough mixture to form the snack food.

2. The process of claim 1, wherein snack food has a high protein concentration and a high fiber concentration.

3. The process of claim 1, wherein the extracting, mixing, and shaping are each accomplished using a twin screw extruder.

4. The process of claim 1, wherein the legumes are field bean, white pea bean, Tepary bean, Mung bean, lima bean, Broadbean, Chickpea, lentil beans, peanuts, buckwheat, and flax.

5. The process of claim 1, and further comprising grinding the legumes to an average grit size of between about 2 and 4 millimeters before the legumes are mixed with the aqueous solvent and the processing aids.

6. The process of claim 1, wherein the aqueous solvent comprises water, steam, or combinations thereof.

7. The process of claim 6, and further comprising heating the legume solution to a temperature of between about 175° F. and 180° F. for between about 15 and 30 minutes.

8. The process of claim 1, wherein the processing aids comprise CaO, $CaCO_3$, CaOH, $CaSO_2$, KOH, $KCO_2$, $Na_2SO_4$, $Na_2CO_3$, NaO, NaCl, NaOH, $C_2H_4O_2$, $C_2H_3NaO_2$, or combinations thereof.

9. The process of claim 8, wherein the concentration of each of the processing aids is between about 0.01 percent by weight and 5.0 percent by weight of the legumes.

10. The process of claim 8, wherein the concentration of all of the processing aids is less than about 10 percent by weight of the legumes.

11. The process of claim 1, and further comprising reducing a moisture content of the legume solution through evaporation.

12. The process of claim 1, wherein the additional ingredients comprise cereal grains, oil seeds, oil seed flour, or combinations thereof.

13. The process of claim 1, wherein the ratio of the legume press cake to the additional ingredients is about 7:3.

14. The process of claim 1, and further comprising heating the dough mixture.

15. The process of claim 1, and further comprising reducing a moisture content of the legume press cake as the legume press cake and the additional ingredients are mixed together.

16. The process of claim 1, wherein shaping the dough mixture comprises forming the dough mixture into a flat sheet and then cutting the flat sheet into pieces.

17. The process of claim 1, wherein cooking the shaped dough comprises drying, baking, puffing, frying, or combinations thereof.

18. The process of claim 1, and further comprising coating the shaped dough mixture.

19. A process for producing a reduced-flatulence, high-protein, high-fiber dough mixture, the process comprising:

mixing legumes with an aqueous solvent and processing aids to form a legume solution;

hydrating the legumes in the legume solution;

passing the legume solution through an extruder to extract an aqueous solution from the legume solution and form a legume press cake, wherein the aqueous solution contains oligosaccharides, polysaccharides, or combinations thereof;

reducing the moisture content of the legume press cake; and mixing additional ingredients with the legume press cake to form the dough mixture.

20. The process of claim 19, wherein the legumes are field bean, white pea bean, Tepary bean, Mung bean, lima bean, Broadbean, Chickpea, lentil beans, peanuts, buckwheat, and flax.

21. The process of claim 19, and further comprising grinding the legumes to an average grit size of between about 2 and 4 millimeters before the legumes are mixed with the aqueous solvent and the processing aids.

22. The process of claim 19, wherein the aqueous solvent comprises water, steam, or combinations thereof.

23. The process of claim 22, and further comprising heating the legume solution to a temperature of between about 175° F. and 180° F. for between about 15 and 30 minutes.

24. The process of claim 19, wherein the processing aids comprise CaO, $CaCO_3$, CaOH, $CaSO_2$, KOH, $KCO_2$, $Na_2SO_4$, $Na_2CO_3$, NaO, NaCl, NaOH, $C_2H_4O_2$, $C_2H_3NaO_2$, or combinations thereof.

25. The process of claim 19, wherein the additional ingredients comprise cereal grains, oil seeds, oil seed flour, or combinations thereof.

26. The process of claim 19, wherein the ratio of the legume press cake to the additional ingredients is about 7:3.

* * * * *